Patented Feb. 13, 1951

2,541,211

UNITED STATES PATENT OFFICE 2,541,211

TERTIARY-AMINOALKYL-TETRA-HYDROCARBAZOLES

John W. Cusic, Skokie, and Clinton A. Dornfeld, Chicago, Ill., assignors to G. D. Searle & Co., Chicago, Ill., a corporation of Illinois No Drawing. Application October 15, 1948,
Serial No. 54,824

10 Claims. (Cl. 260—315)

This invention relates to tetrahydrocarbazole derivatives substituted on the nitrogen atom thereof by tertiary-aminoalkyl radicals, to salts of such bases, and to processes of producing said compounds. More particularly, this invention relates to compounds of the following general structural formula

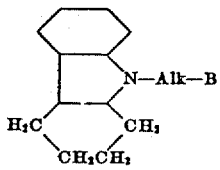

wherein Alk is a lower alkylene radical and B is a tertiary aliphatic-type amino radical.

In the above structural formula, Alk represents a bivalent aliphatic hydrocarbon radical containing two to five carbon atoms and having at least two carbon atoms (preferably two or three) between the N and B groupings. Alk therefore represents radicals such as ethylene, propylene, trimethylene, tetramethylene, 1,2-butylene, 1,3-butylene, 2,3-butylene, and the amylene radicals.

In the foregoing structural formula, B represents a tertiary non-aromatic organic amino radical, such as a dialkylamino radical composed of the same or different lower alkyl radicals containing one to five carbon atoms, such as methyl, ethyl, propyl, isopropyl, butyl, isobutyl, secondary-butyl, amyl, isoamyl, and the like. The organic groups attached to the amino nitrogen atom can also be polymethylene chains having four or more carbon atoms, which, with the nitrogen atom, form pyrrolidino, piperidino, lupetidino, methylpyrrolidino, ethylpyrrolidino, and related cyclic amino radicals which are aliphatic in nature. Other aliphatic-type cyclic amino groups which are represented by B include morpholino, thiamorpholino, piperazino, and related radicals. B can also represent alkylolamino radicals such as diethanolamino, methylethanolamino, methylisopropanolamino, dihydroxypropylamino, ethyldihydroxypropylamino, and the like. It is thus seen that the amino radical B represents tertiary aliphatic-type amino radicals. These are amino radicals derived from secondary non-aromatic organic amines having basic dissociation constants in the range of $10^{-3}$ to $10^{-6}$.

The compounds of this invention may be obtained in the form of salts with organic or inorganic acids, such as hydrochloric, hydrobromic, hydriodic, sulfuric, sulfamic, phosphoric, citric, tartaric, maleic, malic, benzoic, mandelic, cinnamic, acetic, lactic, and other acids which are non-toxic at the therapeutic level of dosage. Acidic substances such as 8-chlorotheophylline, 8-bromotheophylline, 8-chlorocaffeine, and related 8-haloxanthines can also be used for salt formation. Quaternary ammonium salts can be prepared by reaction of the basic substances with reactive esters of strong organic or inorganic acids. Among such esters are methyl chloride, methyl bromide, methyl iodide, ethyl bromide, propyl bromide, butyl chloride, amyl iodide, ethylene bromohydrin, propylene bromohydrin, $\beta,\gamma$-dihydroxypropyl bromide, methyl p-toluene-sulfonate, ethyl benzenesulfonate, dimethyl sulfate, benzyl chloride, benzyl bromide, naphthylmethyl chloride, anisyl chloride, and related esters. The basic compounds are soluble in organic solvents, but generally insoluble in water, whereas the salts are generally soluble in water. The salts, consequently, form a preferred embodiment of our invention, particularly for use in medicinal preparations.

The compounds of this invention are useful as intermediate in the preparation of complex organic substances for use as pharmaceuticals and dye-stuffs. The compounds are also of value as medicinal agents, especially as antihistaminic and as antispasmodic drugs. It is the object of this invention to provide novel chemical substances which are useful for the foregoing purposes, as well as to provide efficient methods for manufacturing such substances.

The compounds of this invention are produced by reacting tetrahydrocarbazole with an aminoalkyl halide or other reactive ester in the presence of caustic alkali, at elevated temperatures in the range of 50–150° C. The reaction can be conducted efficiently by the use of 1 mole of tetrahydrocarbazole and 1 mol of alkali for each mole of aminoalkyl halide. In practice it is found to be desirable to use an excess of 10 to 50% of aminoalkyl halide in relation to the tetrahydrocarbazole, and to use a quantity of alkali equivalent to that of aminoalkyl halide. Acid addition salts of the aminoalkyl halide can also be used. In such case, additional alkali equivalent to the acid is used. The reactions can be carried out by mixing the dry reagents at elevated temperatures for periods of time varying from 2 to 20 hours, or they can be carried out by agitating a hot solution or suspension of the reagents in an inert solvent such as hydrocarbons boiling in the range of 50–150° C. As condensation agents, alkali, particularly caustic alkali, is employed. Powdered sodium and potassium hydroxides are preferred, but lithium hydroxide and other alkali metal hydroxides are also suitable.

Besides aminoalkyl halides such as chlorides, bromides and iodides, other aminoalkyl esters can be used in our process, as for example aminoalkyl esters of aromatic sulfonic acids such as toluenesulfonic acid. After the condensation reaction has been achieved, the basic carbazole derivatives may be isolated by conventional procedures, for example, the organic solvent containing the basic substances may be extracted with acid or may be evaporated under reduced pressure, and the basic carbazole product can subsequently be distilled under diminished pressure.

Our invention is disclosed in further detail in the following examples, which are provided for the purpose of illustration and are intended in no way to limit the invention in spirit or in scope. The relative amounts of reagents are given in parts by weight.

*Example 1*

171 parts of tetrahydrocarbazole, 340 parts of β-diethylaminoethyl chloride hydrochloride, and 300 parts of powdered potassium hydroxide are mixed. After the spontaneous reaction subsides, the mixture is heated at 95–100° Centigrade for 8 hours with occasional agitation. The reaction mixture is decomposed with cold water and extracted with ether. The ether solution is dried and evaporated. The residue of N-β-diethylaminoethyltetrahydrocarbazole distils at 184–185° C. at 5 millimeters pressure. It has the following structural formula

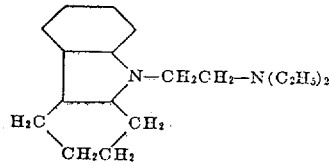

The hydrochloride of the above base is formed by treating a dry ether solution of the base with one equivalent of anhydrous alcoholic hydrogen chloride. The salt separates as an oil which solidifies on standing. After recrystallization from isopropanol diluted with ether, or from ethyl acetate, N-β-diethylaminoethyltetrahydrocarbazole hydrochloride melts at 139–140° C.

By a procedure similar to the above, but using 225 parts of β-dibutylaminoethyl chloride hydrochloride, there is produced N-β-dibutylaminoethyltetrahydrocarbazole, which has the formula

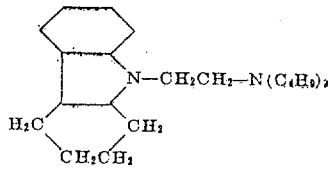

It is a viscous, light-colored oil, insoluble in water but soluble in dilute mineral acid.

*Example 2*

A mixture of 51.3 parts of tetrahydrocarbazole, 20 parts of powdered caustic soda and 74 parts of β-piperidinoethyl chloride is heated at about 100° C. with occasional agitation for 10 hours. Then cold water is added and the mixture is extracted with ether. The ether extract is dried and stripped of solvent under vacuum. There is thus obtained N-β-piperidinoethyltetrahydrocarbazole, a light yellow oil distilling at about 190–193° C. at 5 mm. It has the formula

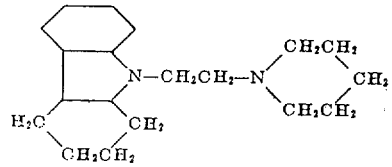

*Example 3*

By the method of Example 2, using 75 parts of β-morpholinoethyl chloride, there is produced N-β-morpholinoethyltetrahydrocarbazole. This product is a light yellow high-boiling oil distilling at about 184–188° C. at 4 mm. It has the formula

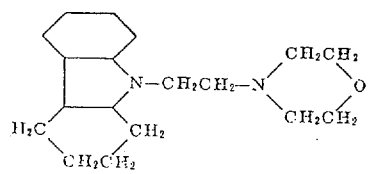

*Example 4*

A mixture of 513 parts of tetrahydrocarbazole, 560 parts of anhydrous powdered potassium hydroxide, and 800 parts of dry toluene is agitated and heated to about 110° C. To this hot suspension are added over a period of 2 hours 720 parts of β-dimethylaminoethyl chloride hydrochloride. 200 parts of potassium hydroxide are added and the mixture is heated and agitated for 2 hours longer. The organic layer is removed and washed with water, then extracted with dilute hydrochloric acid. The N-β-dimethylaminoethyltetrahydrocarbazole hydrochloride precipitates from the aqueous solution and is removed by filtration. After drying and recrystallization from alcohol, this salt melts at 243–244° C. The base has the formula

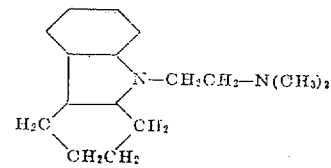

*Example 5*

51.3 parts of tetrahydrocarbazole and 40 parts of granular sodium hydroxide in 80 parts of dry toluene at 100° C. are agitated and treated with 79 parts of β-dimethylaminopropyl chloride hydrochloride. After the addition is complete, the mixture is heated and agitated at about 80° C. for 15 hours. The reaction mixture is filtered and the filtrate is extracted with dilute hydrochloric acid. The acid extract is made alkaline and extracted with ether. The ether solution is dried with anhydrous potassium carbonate and evaporated. The residue of N-β-dimethylaminopropyltetrahydrocarbazole distils at 138–145° C. at 0.15 mm. pressure. It has the following formula

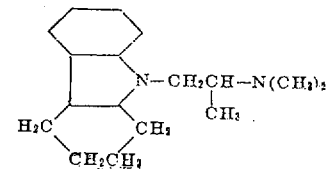

The citrate of the above base is formed by dissolving 25.4 parts of USP citric acid in 20 parts of hot alcohol. This solution is diluted with 708 parts of anhydrous ether. To the resulting solution is added dropwise a solution of 31 parts of N - β - dimethylaminopropyltetrahydrocarbazole in 177 parts of anhydrous ether. Upon chilling a precipitate of the citrate forms. This is removed by filtration, washed with anhydrous ether, and dried. It is recrystallized from methyl ethyl ketone, washed with dry ether, and dried at 64° C. N - β - dimethylaminopropyltetrahydrocarbazole citrate so obtained has an indefinite melting point between 80 and 90° C. On analysis it shows 6.01% nitrogen; calculated 6.25%.

*Example 6*

N - β - dimethylaminobutyltetrahydrocarbazole is produced according to the process of Example 5, using 80 parts of β-dimethylaminobutyl bromide, 20 parts of powdered sodium hydroxide and 51.3 parts of tetrahydrocarbazole. It distils at about 147–152° C. at 0.1 mm. pressure and has the formula

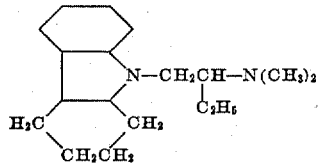

*Example 7*

An intimate mixture of 17 parts of tetrahydrocarbazole, 20 parts of γ-diethylaminopropyl chloride and 7 parts of powdered sodium hydroxide is heated to 100–105° C. for 8 hours. Water is added to the chilled reaction mixture and the resulting suspension is extracted with ether. After drying the ether extract is evaporated. There is thus obtained N-γ-diethylaminopropyltetrahydrocarbazole

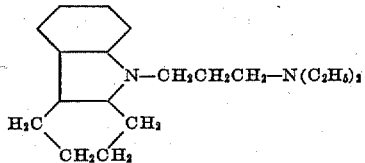

It is a light-colored oil distilling in the range of 172–177° C. at 2 mm. pressure.

We claim:

1. A member of the group consisting of an N - (tertiary - amino - alkyl) tetrahydrocarbazole, and salts thereof, wherein the tetrahydrocarbazole radical is devoid of substituents attached to the carbon atoms thereof.

2. A member of the group consisting of an N - (dialkylaminoalkyl) tetrahydrocarbazole, and salts thereof, wherein the tetrahydrocarbazole radical is devoid of substituents attached to the carbon atoms thereof.

3. A member of the group consisting of a basic tetrahydrocarbazole of the formula

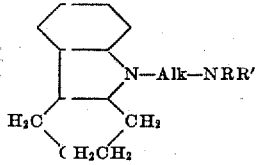

wherein Alk is a lower alkylene radical and R and R' are lower alkyl radicals, and salts thereof.

4. A member of the group consisting of a basic tetrahydrocarbazole of the formula

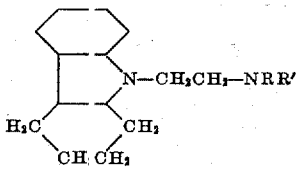

wherein R and R' are lower alkyl radicals, and salts thereof.

5. A member of the group consisting of N-β-dimethylaminoethyltetrahydrocarbazole and salts thereof.

6. N - β - dimethylaminoethyltetrahydrocarbazole hydrochloride.

7. N-β-morpholinoethyltetrahydrocarbazole.

8. N-β-piperidinoethyltetrahydrocarbazole.

9. N-β-diethylaminoethyltetrahydrocarbazole.

10. N - β - dimethylaminopropyltetrahydrocarbazole.

JOHN W. CUSIC.
CLINTON A. DORNFELD.

REFERENCES CITED

The following references are of record in the file of this patent:

UNITED STATES PATENTS

| Number | Name | Date |
|---|---|---|
| 2,016,480 | Bockmuhl et al. | Oct. 8, 1935 |

FOREIGN PATENTS

| Number | Country | Date |
|---|---|---|
| 377,255 | Great Britain | July 14, 1932 |

OTHER REFERENCES

Heilbron: "Dictionary of Organic Compounds" (Oxford University Press; New York; 1943), vol. III, page 693.

Huttrer et al.: J. Am. Chem. Soc., vol. 68, pp. 1999–2002 (1946).

Hartman: California Medicine, vol. 66, pp. 242–248 (April 1947).

Huttrer: Enzymologia, vol. 12, pp. 278 and 318–322 (April 26, 1948).